(12) United States Patent
Hsieh

(10) Patent No.: US 10,185,427 B2
(45) Date of Patent: *Jan. 22, 2019

(54) DEVICE AND METHOD FOR LOCALIZED FORCE SENSING

(71) Applicant: SYNAPTICS INCORPORATED, San Jose, CA (US)

(72) Inventor: Lin-Hsiang Hsieh, Taoyuan (TW)

(73) Assignee: SYNAPTICS INCORPORATED, San Jose, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 14/483,868

(22) Filed: Sep. 11, 2014

(65) Prior Publication Data

US 2016/0077648 A1 Mar. 17, 2016

(51) Int. Cl.
*G06F 3/041* (2006.01)

(52) U.S. Cl.
CPC .................. *G06F 3/0414* (2013.01)

(58) Field of Classification Search
CPC .................. G06F 3/044; G06F 5/0414; G06F 2203/04103; G06F 3/0414; G06F 2203/04105
See application file for complete search history.

(56) References Cited

U.S. PATENT DOCUMENTS

| 5,510,813 | A | * | 4/1996 | Makinwa | ............ | G06F 3/041 |
|           |   |   |        |         |              | 341/33     |
| 5,942,733 | A |   | 8/1999 | Allen et al. | | |
| 5,943,044 | A |   | 8/1999 | Martinelli et al. | | |
| 6,002,389 | A |   | 12/1999 | Kasser | | |
| 7,154,481 | B2 |  | 12/2006 | Cross et al. | | |
| 7,395,717 | B2 |  | 7/2008 | DeAngelis et al. | | |
| 7,538,760 | B2 |  | 5/2009 | Hotelling et al. | | |
| 7,825,911 | B2 |  | 11/2010 | Sano et al. | | |
| 8,063,886 | B2 |  | 11/2011 | Serban et al. | | |

(Continued)

FOREIGN PATENT DOCUMENTS

| WO | 2009030922 A2 | 3/2009 |
| WO | 2013009778 A1 | 1/2013 |
| WO | 2014037016 A1 | 3/2014 |

OTHER PUBLICATIONS

Korean Intellectual Property Office International Searching Authority, International Search Report and Written Opinion for International Application No. PCT/US2014/023037, dated Jul. 9, 2014.

(Continued)

*Primary Examiner* — Dorothy Harris
(74) *Attorney, Agent, or Firm* — Ferguson Braswell Fraser Kubasta PC

(57) ABSTRACT

A device and method for operating a capacitive input device configured to sense input objects and their applied force in a sensing region includes a pliable component having an input surface and a first substrate including a first plurality of sensor electrodes. The device also includes a support substrate spaced apart from the pliable component; a second substrate having a second plurality of sensor electrodes and a plurality of apertures; and a spacing layer disposed between the pliable component and the support substrate and having a plurality of raised features aligned with and facing away from the apertures of the second substrate.

14 Claims, 3 Drawing Sheets

(56) References Cited

U.S. PATENT DOCUMENTS

| | | | |
|---|---|---|---|
| 8,607,651 B2 | 12/2013 | Eventoff | |
| 8,627,716 B2 | 1/2014 | Son | |
| 8,653,834 B2 | 2/2014 | Reynolds | |
| 8,730,199 B2 | 5/2014 | Sleeman et al. | |
| 9,075,095 B2* | 7/2015 | Kallassi | G01R 27/2605 |
| 9,201,468 B2* | 12/2015 | Schediwy | G06F 1/1692 |
| 9,229,592 B2* | 1/2016 | Bulea | G06F 3/044 |
| 9,454,255 B2* | 9/2016 | El Kallassi | G01R 27/2605 |
| 2001/0013855 A1 | 8/2001 | Fricker et al. | |
| 2004/0090429 A1 | 5/2004 | Geaghan et al. | |
| 2005/0145045 A1* | 7/2005 | Papakostas | G01L 1/20 73/864 |
| 2006/0260417 A1 | 11/2006 | Son et al. | |
| 2007/0229464 A1* | 10/2007 | Hotelling | G06F 3/0414 345/173 |
| 2007/0236466 A1 | 10/2007 | Hotelling | |
| 2008/0158173 A1 | 7/2008 | Hamblin et al. | |
| 2008/0174321 A1 | 7/2008 | Kang et al. | |
| 2009/0091551 A1 | 4/2009 | Hotelling et al. | |
| 2009/0267916 A1 | 10/2009 | Hotelling | |
| 2009/0314621 A1 | 12/2009 | Hotelling | |
| 2010/0242629 A1 | 9/2010 | Leuenberger et al. | |
| 2010/0253651 A1* | 10/2010 | Day | G06F 3/044 345/175 |
| 2010/0282000 A1* | 11/2010 | Gorjanc | G01L 1/146 73/862.046 |
| 2011/0057899 A1* | 3/2011 | Sleeman | G01L 1/146 345/174 |
| 2011/0227836 A1* | 9/2011 | Li | G06F 3/0414 345/173 |
| 2011/0227872 A1 | 9/2011 | Huska et al. | |
| 2012/0013573 A1 | 1/2012 | Liu et al. | |
| 2012/0026124 A1 | 2/2012 | Li et al. | |
| 2012/0038583 A1 | 2/2012 | Westhues et al. | |
| 2012/0062245 A1 | 3/2012 | Bao et al. | |
| 2012/0086666 A1* | 4/2012 | Badaye | G06F 3/0416 345/174 |
| 2012/0105367 A1 | 5/2012 | Son et al. | |
| 2012/0206401 A1 | 8/2012 | Lin et al. | |
| 2012/0256876 A1* | 10/2012 | Yeh | G06F 3/044 345/174 |
| 2012/0299866 A1 | 11/2012 | Pao et al. | |
| 2012/0313873 A1 | 12/2012 | Bright et al. | |
| 2013/0021089 A1 | 1/2013 | Sakurai et al. | |
| 2013/0030740 A1 | 1/2013 | Bulea | |
| 2013/0047747 A1 | 2/2013 | Joung | |
| 2013/0050139 A1 | 2/2013 | Gute | |
| 2013/0063387 A1* | 3/2013 | Takai | G06F 3/0414 345/173 |
| 2013/0068038 A1 | 3/2013 | Bolender et al. | |
| 2013/0099802 A1* | 4/2013 | Hsieh | G06F 3/044 324/661 |
| 2014/0002113 A1 | 1/2014 | Schediwy et al. | |
| 2014/0022201 A1 | 1/2014 | Boychuk et al. | |
| 2014/0062933 A1* | 3/2014 | Coulson | G06F 3/044 345/174 |
| 2014/0238152 A1* | 8/2014 | Kallassi | G01R 27/2605 73/862.626 |
| 2015/0130742 A1 | 5/2015 | Chen et al. | |
| 2015/0268784 A1* | 9/2015 | Kallassi | G01R 27/2605 345/174 |

OTHER PUBLICATIONS

Korean Intellectual Property Office International Searching Authority, International Search Report and Written Opinion for International Application No. PCT/US2014/038775, dated Oct. 28, 2014.

USPTO, Non-Final Office Action Response in U.S. Appl. No. 13/838,003, filed Jun. 30, 2014.

USPTO, Notice of Allowance and Fee(s) Due in U.S. Appl. No. 13/838,003, dated Aug. 18, 2014.

Korean Intellectual Property Office International Searching Authority, International Search Report and Written Opinion for International Application No. PCT/US2014/017900, dated Jun. 8, 2014.

International Search Report and Written Opinion issued in PCT/US2015/049372, dated Dec. 21, 2015 (16 pages).

\* cited by examiner

DEVICE AND METHOD FOR LOCALIZED FORCE SENSING

FIELD OF THE INVENTION

This invention generally relates to electronic devices, and more specifically to sensor devices and using sensor devices for producing user interface inputs.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

Some input devices also have the ability to detect applied force in addition to determining positional information for input objects interacting with a sensing region of the input device. However, presently known force/touch input devices are limited in their ability to accurately, repeatedly, and uniformly determine the position and/or intensity at which force is applied. This limits the flexibility and usability of presently known force enabled input devices. An improved force enhanced input device is thus needed which addresses these limitations.

BRIEF SUMMARY OF THE INVENTION

Embodiments of the present invention provide a device and method that facilitates improved device usability. The device and method provide improved user interface functionality through the use of a Z-sensor layer having through holes, and an elastic tensile layer having raised structures (nubs) overlaid on the Z-sensor layer with the nubs facing away from the through holes. The centerline of each nub is aligned with the centerline of each through-hole to allow a nub to move in the Z-direction to achieve uniform local deflection in response to applied force. Consequently, the force data associated with coordinate locations may be interpolated to accurately determine the coordinate position and/or magnitude of the input object applying the force.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
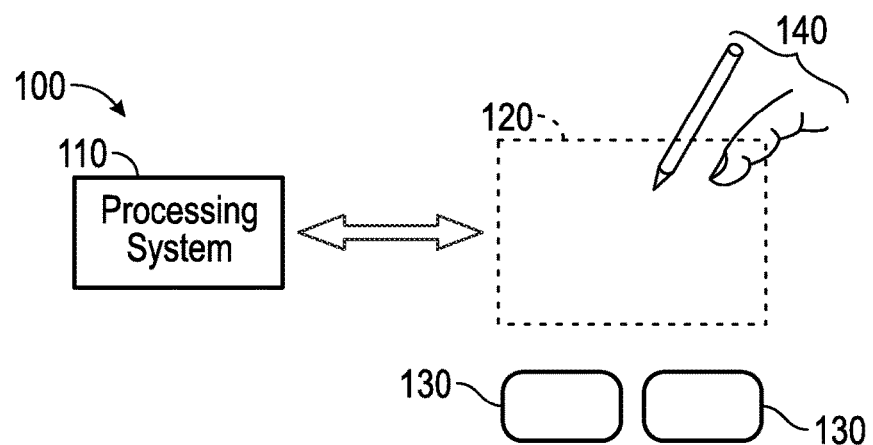
FIG. 1 is a block diagram of an exemplary electronic system that includes an input device and a processing system in accordance with an embodiment of the invention.

Turning now to the figures, FIG. 1 is a block diagram of an exemplary input device 100 in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 may encompass any space above (e.g., hovering), around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor(s). This force information can then also be used by the system to provide a wide range of user interface functionality, for example, by providing different user interface functions in response to different levels of applied force by objects in the sensing region. Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The input device 100 may utilize any combination of sensor components and sensing technologies to detect user input (e.g., force, proximity) in the sensing region 120 or otherwise associated with the touchpad. The input device 100 comprises one or more sensing elements for detecting user input. As several non-limiting examples, the input device 100 may use capacitive, elastive, resistive, inductive, magnetic, acoustic, ultrasonic, and/or optical techniques.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a deflection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner. In various embodiments, the force sensors may be based on changes in capacitance and/or changes in resistance.

In FIG. 1, a processing system 110 is shown as part of the input device 100. However, in other embodiments the processing system may be located in the host electronic device with which the touchpad operates. The processing system 110 is configured to operate the hardware of the input device 100 to detect various inputs from the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information, particularly regarding the presence of an input object in the sensing region. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. For example, buttons 130 may be placed near the sensing region 120 and used to facilitate selection of items using the input device 100. Other types of additional input components include sliders, balls, wheels, switches, and the like. Conversely, in some embodiments, the input device 100 may be implemented with no other input components.

In some embodiments, the electronic system 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a deflection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner.

As described above, in some embodiments some part of the electronic system processes information received from the processing system to determine input information and to act on user input, such as to facilitate a full range of actions. It should be appreciated that some uniquely input information may result in the same or different action. For example, in some embodiments, input information for an input object comprising, a force value F, a location X, Y and a time of contact T may result in a first action. While input information for an input object comprising a force value F', a location X', Y' and a time of contact T' (where the prime values are uniquely different from the non-prime values) may also result in the first action. Furthermore, input information for an input object comprising a force value F, a location X', Y and a time of contact T' may result in a first action. While the examples below describe actions which may be performed based on input information comprising a specific range of values for force, position and the like, it should be appreciated that that different input information (as described above) may result in the same action. Furthermore, the same type of user input may provide different functionality based on a component of the input information. For example, different values of F, X/Y and T may result in the same type of action (e.g. panning, zooming, etc.), that type of action may behave differently based upon said values or other values (e.g. zooming faster, panning slower, and the like).

As noted above, the embodiments of the invention can be implemented with a variety of different types and arrangements of capacitive sensor electrodes for detecting force and/or positional information. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction. In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

In some embodiments, the input device is comprises a sensor device configured to detect contact area and location of a user interacting with the device. The input sensor device may be further configured to detect positional information about the user, such as the position and movement of the hand and any fingers relative to an input surface (or sensing region) of the sensor device.

In some embodiments, the input device is used as an indirect interaction device. An indirect interaction device may control GUI actions on a display which is separate from the input device, for example a touchpad of a laptop computer. In one embodiment, the input device may operate as a direct interaction device. A direct interaction device controls GUI actions on a display which underlies a proximity sensor, for example a touch screen. For example, an indirect input device may be used to position a cursor over a button by moving an input object over a. proximity sensor. This is done indirectly, as the motion of the input object does not overlap the response on the display. In a similar case, a direct interaction device may be used to position a cursor over a button by placing an input object directly over or onto the desired button on a touch screen.

Figure 2:
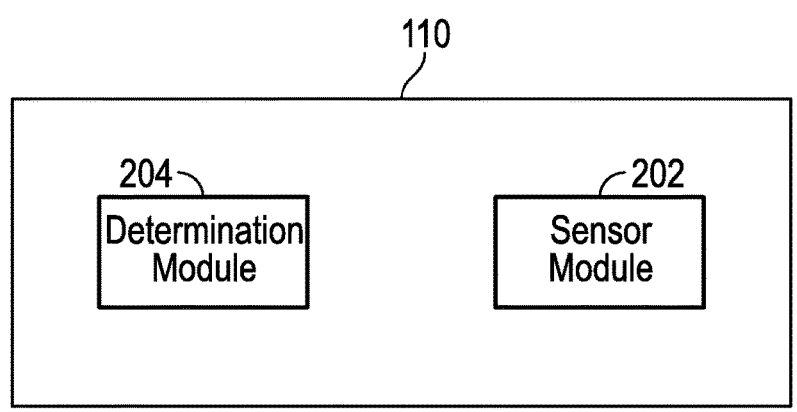
FIG. 2 is a schematic view of an exemplary processing system in accordance with an embodiment of the invention.

Referring now to FIGS. 1 and 2, the processing system 110 includes a sensor module 202 and a determination module 204. Sensor module 202 is configured to operate the sensors associated with the input device 100 and sensing region 120. For example, the sensor module 202 may be configured to transmit sensor signals and receive resulting signals from the sensors associated with sensing region 120. Determination module 204 is configured to process data (e.g. the resulting signals) and to determine positional information and force information for input objects interacting with the sensing region 120. The embodiments of the invention can be used to enable a variety of different capabilities on the host device. Specifically, it can be used to enable cursor positioning, scrolling, dragging, icon selection, closing windows on a desktop, putting a computer into sleep mode, or perform any other type of mode switch or interface action.

Figure 3:
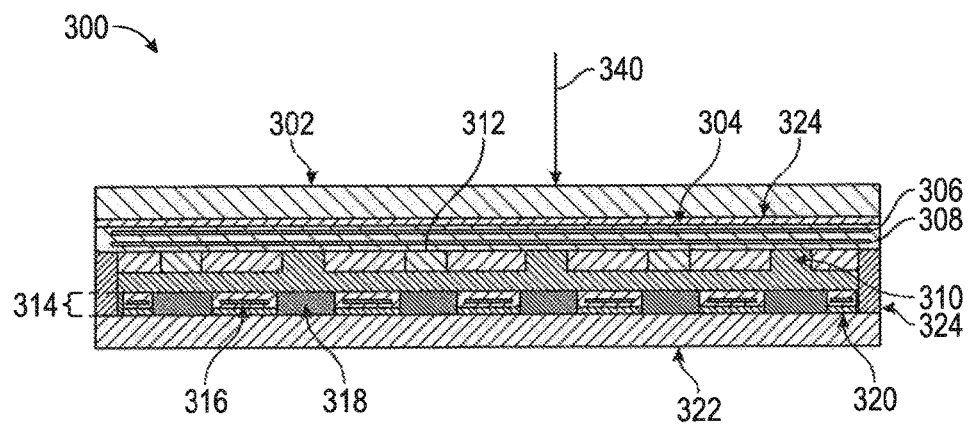
FIG. 3 is a schematic cross section view of a force enabled sensor stack-up in accordance with an embodiment of the invention.

FIG. 3 is a schematic cross section view of a force enabled sensor stack-up 300 including a facesheet 302 (e.g., mylar), a PET sensor layer 304 including a touch receiver electrode layer 306 and a transmitter electrode layer 308, a deformable layer 310 including a plurality of raised structures (nubs) 312, a Z-sensor layer 314 including an array of through holes 318 interposed among a plurality of force receiver electrodes 316, and a rigid (e.g., metal) stiffener layer 322. The facesheet 302 and the deformable layer 310 are configured to locally deflect downwardly in response to a force applied to the input surface thereby move at least one of the transmitter electrodes 308 towards force receiver electrodes 316, as described in greater detail below. The facesheet 302 may be secured to the PET sensor layer 304 by an adhesive layer 324; the Z-sensor layer 314 may be secured to the stiffener layer 322 by an adhesive layer 320; and the perimeter of the PET sensor layer 304 may be secured to the perimeter of the stiffener layer 322 by an adhesive layer 324.

Those skilled in the art will appreciate that the touch receiver electrode layer 306 and a transmitter electrode layer 308 capacitively couple to produce a touch image indicative of the position of a conductive input object.

By aligning each nub 312 with a corresponding through hole (aperture) 318, pressure applied by an input object (e.g., finger) along the arrow 340 causes the region under each nub to be urged into an a corresponding through hole 318, to be restored by the elastic "drumhead" action of the deformable layer 310 when the applied force is removed. As a result of the applied force, the distance between at least one transmitter electrode 308 and at least one force receiver electrode 316 in the vicinity of the applied force decreases, producing a capacitive signal generally proportional to the amount of applied force. In various embodiments, the narrow local deflection zone produces uniform and repeatable force measurements.

Figure 4:
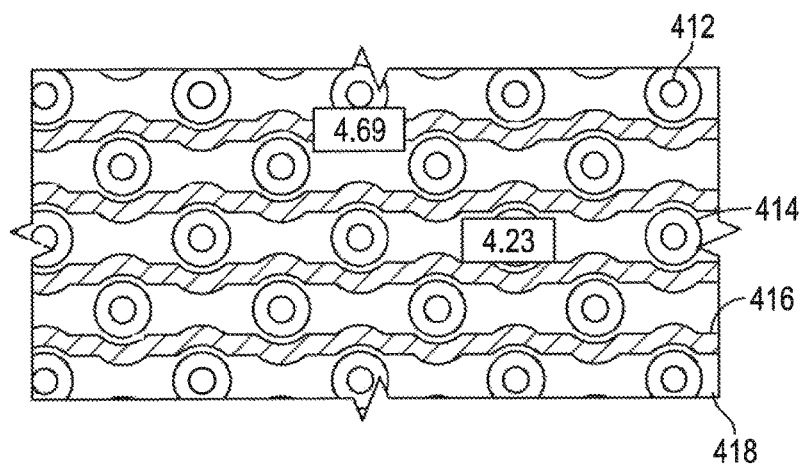
FIG. 4 is a top plan view of the nub and through hole alignment in accordance with an embodiment of the invention.

FIG. 4 is a top plan view of a transparent deformable :layer having a plurality of upwardly facing raised structures (nubs) 412, overlying a Z-sensor layer 418 including an array of through holes 414 interposed among a plurality of horizontally extending force receiver electrodes 416, illustrating the nub and through hole alignment in accordance with an embodiment. More particularly, each nub 412 is shown aligned with each through hole 414, although the number of nubs may alternatively be greater or less than the number of through holes.

Figure 5:
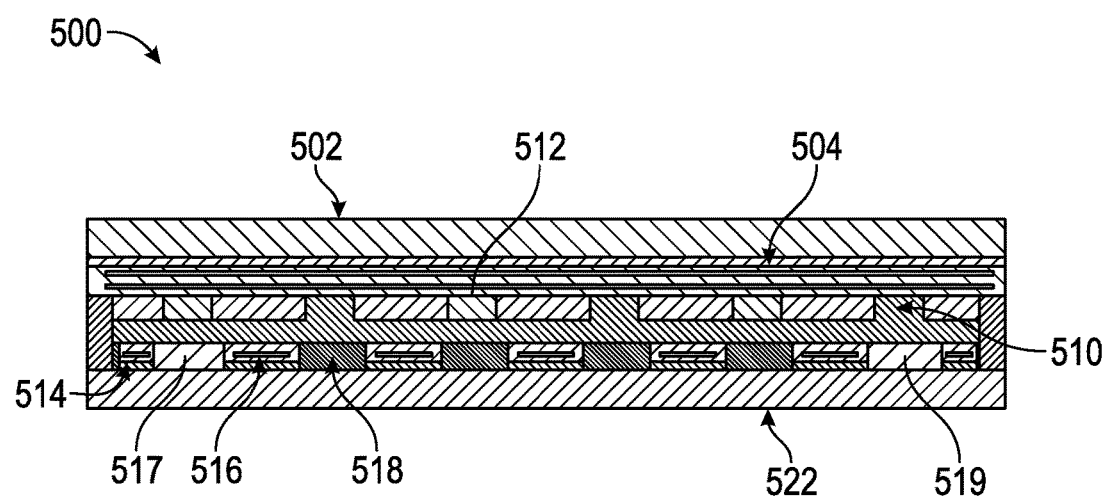
FIG. 5 is a cross section view of the input device of FIG. 3 including downwardly facing nubs to facilitate the alignment of the upward facing nubs with respect to the through underlying holes in accordance with an embodiment of the invention.

FIG. 5 is a cross section view of an input device sensor stackup 500 generally analogous to that shown in FIG. 3, further including downwardly facing nubs to facilitate the alignment of the nubs on the deformable layer with respect to the underlying through holes in accordance with an embodiment of the invention. More particularly, the sensor stack-up 500 includes a facesheet 502, a PET sensor layer 504, a deformable layer 510 including a plurality of raised structures (nubs) 512, a Z-sensor layer 514 including an array of through holes 518 interposed among a plurality of force receiver electrodes 516, and a rigid (e.g., metal) stiffener layer 522. In addition, the deformable layer 510 also includes one or more downwardly facing structures such as nubs 517, 519. These downwardly facing structures 517, 519 may fit into some of the through holes 518 preferably located along or near the perimeter (e.g., corners) of the sensing region. Once the downwardly facing structures 517, 519 are inserted into their respective through holes 518, the deformable layer may be precisely aligned with the underlying sensor layer. These alignment includes the centerlines of the upward facing nubs 512 being aligned with the centerlines of their corresponding through holes 518.

An input device is thus provided for an electronic system, the input device including: a pliable component having: i) an input surface; and ii) a first substrate including a first plurality of sensor electrodes; a support substrate spaced apart from the pliable component; a second substrate having a second plurality of sensor electrodes and a plurality of apertures; and a spacing layer disposed between the pliable component and the support substrate and having a plurality of raised features aligned with and facing away from the apertures of the second substrate.

In an embodiment, the spacing layer is configured to locally deform in response to a force applied to the input surface and, in response to a force applied to the input surface, a portion of the spacing layer is deflected into a volume defined by an aperture of the second substrate.

In an embodiment, the first plurality of sensor electrodes is configured to detect positional information for input objects in a sensing region of the input device.

In an embodiment, a first subset of the first plurality of sensor electrodes is disposed above a second subset of the first plurality of sensor electrodes.

In an embodiment, the first subset and the second subset are disposed on either opposite sides of the first substrate or the same side of the first substrate.

In an embodiment, the second plurality of sensor electrodes and a second subset of the first plurality of sensor electrodes are configured to detect force imparted to the input surface of the pliable component.

In an embodiment, the second subset of the first plurality of sensor electrodes is configured to electrically shield the second plurality of sensor electrodes from the first subset of the first plurality of sensor electrodes.

In an embodiment, the plurality of apertures comprises a first array of regularly spaced apertures extending through the second substrate, and a first subset of the second plurality of sensor electrodes comprises a second array of electrodes extending along a first direction and interposed among the first array of apertures.

In an embodiment, the plurality of raised features comprises substantially rigid nubs disposed in alignment with the first array of apertures.

In an embodiment, the rigid nubs overlap the first array of apertures.

A processing system is also provided for use with an input device of the type including a pliable component having an input surface and a first plurality of sensor electrodes, a support substrate spaced apart from the pliable component, a second substrate having a second plurality of sensor electrodes and a plurality of apertures, a spacing layer disposed between the pliable component and the support substrate and having a plurality of raised features aligned with and facing away from the apertures of the second substrate. The processing system is communicatively coupled to the first and second pluralities of sensor electrodes and configured to determine a first type of resulting signal from a first subset of the first plurality of sensor electrodes, and a second type of resulting signal from the second plurality of sensor electrodes, wherein the first type of resulting signal comprises effects of input objects proximate the input surface, and further wherein the second type of resulting signal comprises effects of a force applied to the input surface.

In an embodiment, the processing system is further configured to: determine a proximity image and a force image from the first and second types of resulting signals; and determine a user interface action based on at least one of the proximity image and the force image.

In an embodiment, the processing system is further configured to: drive a sensing signal onto a second subset of the first plurality of sensor electrodes; receive the first type of resulting signal from the first subset of the first plurality of sensor electrodes; and receive the second type of resulting signal from the second plurality of sensor electrodes.

In an embodiment, the first type of resulting signal comprises effects of a capacitive coupling between the first and second subsets of the first plurality of sensor electrodes, and the second type of resulting signal comprises effects of a capacitive coupling between the second subset of the first plurality of sensor electrodes and the second plurality of sensor electrodes.

In an embodiment, the second subset of the first plurality of sensor electrodes is configured to electrically shield the second plurality of sensor electrodes from the first subset of the first plurality of sensor electrodes.

An input device is provided including: a pliable input surface; a first substrate having a first plurality of sensor electrodes; a second substrate having a second plurality of sensor electrodes and a plurality of apertures; a spacing layer disposed between the first substrate and the second substrate and having a plurality of raised features aligned with and facing away from the apertures of the second substrate; and a processing system communicatively coupled to the first and second pluralities of sensor electrodes and configured to determine a first type of resulting signal from a first subset of the first plurality of sensor electrodes, and a second type of resulting signal from the second plurality of sensor electrodes, wherein the first type of resulting signal comprises effects of input objects proximate the input surface, and the second type of resulting signal comprises effects of a force applied to the input surface.

In an embodiment, in response to a force applied to the input surface, the spacing layer locally deforms and a portion of the spacing layer is deflected into a volume defined by an aperture of the second substrate.

In an embodiment, the plurality of apertures comprises a regularly spaced array of apertures extending through the second substrate; a first subset of the second plurality of sensor electrodes comprises an array of electrodes extending along a first direction and interposed among the array of apertures; and the second plurality of sensor electrodes comprises an array of electrodes extending along a second direction substantially orthogonal to the first direction.

In an embodiment, the processing system is configured to: drive a sensing signal onto a second subset of the first plurality of sensor electrodes; receive the first type of resulting signal from the first subset of the first plurality of sensor electrodes; and receive the second type of resulting signal from the second plurality of sensor electrodes.

The embodiments and examples set forth herein are presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device for an electronic system, comprising:
an input surface;
a sensor layer comprising a plurality of transmitter electrodes and a plurality of touch receiver electrodes;
a stiffener layer;
a z-sensor layer above the stiffener layer and comprising:
a plurality of force receiver electrodes; and
a plurality of circular apertures interposed among the plurality of force receiver electrodes; and
a deformable layer disposed between the sensor layer and the z-sensor layer, the deformable layer comprising:
a plurality of circular raised features on the top of the deformable layer, aligned with and facing away from the plurality of circular apertures; and
a plurality of flat regions located below the circular raised features and on the bottom of the deformable layer,
wherein the plurality of flat regions deflect into the plurality of apertures in response to a force applied to the input surface.

2. The input device of claim 1, wherein the deformable layer is configured to locally deform in response to the force.

3. The input device of claim 1, wherein the plurality of touch receiver electrodes is configured to detect positional information for input objects in a sensing region of the input device.

4. The input device of claim 1, wherein the sensor layer further comprises a substrate, and wherein the plurality of touch receiver electrodes are disposed on a top side of the substrate and the plurality of transmitter electrodes are disposed on a bottom side of the substrate.

5. The input device of claim 1, wherein the sensor layer further comprises a substrate, and wherein the plurality of touch receiver electrodes and the plurality of transmitter electrodes are disposed on the same side of the substrate.

6. The input device of claim 1, wherein the plurality of force receiver electrodes are configured to detect the force.

7. The input device of claim 1, wherein the plurality of force receiver electrodes extends along a first direction.

8. A processing system for use with an input device, the processing system configured to:
determine a first type of resulting signal from a plurality of touch receiver electrodes in the input device; and
determine a second type of resulting signal from a plurality of force receiver electrodes in the input device,
wherein the first type of resulting signal comprises effects of input objects proximate an input surface of the input device, and further wherein the second type of resulting signal comprises effects of a force applied to the input surface,
wherein the processing system is coupled to the plurality of touch receiver electrodes, the plurality of force receiver electrodes, and a plurality of transmitter electrodes in the input device, and
wherein the input device comprises a sensor layer comprising the plurality of touch receiver electrodes and the plurality of transmitter electrodes,
wherein the input device further comprises a stiffener layer, and a z-sensor layer above the stiffener layer and comprising:
the plurality of force receiver electrodes; and
a plurality of circular apertures interposed among the plurality of force receiver electrodes,
wherein the input device further comprises a deformable layer disposed between the sensor layer and the z-sensor layer and comprising:
a plurality of circular raised features on the top of the deformable layer, aligned with and facing away from the plurality of circular apertures; and
a plurality of flat regions located below the circular raised features on the bottom of the deformable layer, and
wherein the plurality of flat regions deflect into the plurality of circular apertures in response to the force applied to the input surface.

9. The processing system of claim 8, further configured to:
determine a proximity image and a force image from the first and second types of resulting signals; and
determine a user interface action based on at least one of the proximity image and the force image.

10. The processing system of claim 8, further configured to:
drive a sensing signal onto the plurality of transmitter electrodes;
receive the first type of resulting signal from the plurality of touch receiver electrodes; and
receive the second type of resulting signal from the plurality of force receiver electrodes.

11. The processing system of claim 10, wherein the first type of resulting signal comprises effects of a capacitive coupling between the plurality of touch receiver electrodes and the plurality of transmitter electrodes, and wherein the second type of resulting signal comprises effects of a capacitive coupling between the plurality of transmitter electrodes and the plurality of force receiver electrodes.

12. An input device, comprising:
a pliable input surface;
a sensor layer comprising a plurality of transmitter electrodes and a plurality of touch receiver electrodes;
a stiffener layer;
a z-sensor layer above the stiffener layer and comprising:
a plurality of force receiver electrodes; and
a plurality of circular apertures interposed among the plurality of force receiver electrodes;
a deformable layer disposed between the sensor layer and the z-sensor layer and comprising:
a plurality of circular raised features on the top of the deformable layer, aligned with and facing away from the plurality of circular apertures; and
a plurality of flat regions located below the circular raised features on the bottom of the deformable layer,
wherein the plurality of flat regions deflect into the plurality of circular apertures in response to the force applied to the input surface; and
a processing system communicatively coupled to the plurality of touch receiver electrodes, the plurality of transmitter electrodes, and the plurality of force receiver electrodes, the processing system configured to determine a first type of resulting signal from the plurality of touch receiver electrodes, and a second type of resulting signal from the plurality of force receiver electrodes,
wherein the first type of resulting signal comprises effects of input objects proximate the input surface, and the second type of resulting signal comprises effects of the force applied to the input surface.

13. The input device of claim 12, wherein the plurality of force receiver electrodes comprises:
a first array of electrodes extending along a first direction; and
a second array of electrodes extending along a second direction substantially orthogonal to the first direction.

14. The input device of claim 12, wherein the processing system is configured to:
drive a sensing signal onto the plurality of transmitter electrodes;
receive the first type of resulting signal from the plurality of touch receiver electrodes; and
receive the second type of resulting signal from the plurality of force receiver electrodes.

* * * * *